United States Patent [19]

Wahl

[11] 4,015,566
[45] Apr. 5, 1977

[54] ELECTRONIC IGNITION CONTROL SYSTEM FOR INTERNAL COMBUSTION ENGINES

[75] Inventor: Josef Wahl, Stuttgart, Germany

[73] Assignee: Robert Bosch G.m.b.H., Stuttgart, Germany

[22] Filed: June 17, 1975

[21] Appl. No.: 587,627

[30] Foreign Application Priority Data
July 29, 1974  Germany .......................... 2436421

[52] U.S. Cl. .................... 123/117 R; 123/146.5 A; 60/285
[51] Int. Cl.² ......................................... F02Q 5/04
[58] Field of Search ................ 123/117 R, 146.5 A, 123/148 E, 32 EA; 60/285, 276; 315/209 R

[56] References Cited
UNITED STATES PATENTS

| | | | |
|---|---|---|---|
| 3,738,108 | 6/1973 | Goto et al. ........................... | 60/277 |
| 3,799,136 | 3/1974 | Korteling ........................ | 123/117 R |
| 3,815,560 | 6/1974 | Wahl et al. ..................... | 123/117 R |
| 3,853,103 | 12/1974 | Wahl et al. ..................... | 123/148 E |
| 3,885,534 | 5/1975 | Webster .......................... | 123/117 R |
| 3,923,021 | 12/1975 | Stark .............................. | 123/117 R |
| 3,923,022 | 12/1975 | School ........................... | 123/117 R |
| 3,923,024 | 12/1975 | Polo ................................ | 123/117 R |

Primary Examiner—C. J. Husar
Assistant Examiner—Paul Devinsky
Attorney, Agent, or Firm—Flynn & Frishauf

[57] ABSTRACT

The ignition timing, or ignition instant, is determined by generating electric voltages representative of various operating parameters of the internal combustion engine, and modifying these voltages in a function generator to derive ignition control signals. An entirely electronic, or servo-operated adjustment system is responsive to the modified voltages to control the ignition system for proper timing of the ignition spark; in accordance with the present invention, the control system forms part of a closed control loop. In accordance with a feature of the invention, the engine itself forms part of the control loop, in that the effect on an operation parameter of the engine, for example composition of exhaust gases, is evaluated and fed back as an input control quantity to modify the ignition timing.

14 Claims, 5 Drawing Figures

SPARK ADVANCE CONTROL SIGNAL    FROM COMPARATOR 23    SPARK RETARD CONTROL SIGNAL

ELECTRONIC IGNITION CONTROL SYSTEM FOR INTERNAL COMBUSTION ENGINES

CROSS-REFERENCE TO RELATED INVENTIONS

U.S. Pat. No. 3,815,560;
U.S. Pat. No. 3,853,703;
assigned to the assignee of the present application.

The present invention relates to an electronic control system to determine the ignition instant for ignition of internal combustion engines. A function generator provides an electrical voltage, or other electrical signal based on an operation parameter of the internal combustion engine, the signal then operating an adjustment system to set the proper ignition angle, mechanically, the adjustment system being either electronic, or servo-operated.

It has previously been proposed to evaluate various operating data corresponding to instantaneous operating conditions of the internal combustion engine. Typical data which are evaluated are engine speed, induction pipe pressure (or, rather, vacuum), opening angle, or position of the engine throttle, operating temperature (particularly lubricating oil, or cooling water temperature) or the like. All these operating parameters are evaluated, and transducer elements provide electrical signals, typically electrical voltages, which can be combined or summed to provide a control quantity which is applied to a function generator operating in accordance with engine characteristics, to then control the ignition timing device. Such known devices, therefore, operate in accordance with direct control. Such systems, when properly adjusted and operated, provide for substantial decrease in emission of noxious components from the exhaust gases of internal combustion engines; their overall effectiveness is limited, however.

It is an object of the present invention to so control the operation of an internal combustion engine that it will have actual desired operating characteristics, by changing of the ignition instant, e.g., that the exhaust emission from the engine is as free from noxious components as possible.

SUBJECT MATTER OF THE PRESENT INVENTION

The ignition timing adjustment system is part of a closed control loop, to which the adjustment system reacts, or feeds back information, or signals to the respective control parameter which it is desired to maintain at maximum accuracy; the control circuit is further subjected to a basic, or direct control, for example control by speed, engine loading, or both. The control derived from the closed loop is superimposed on the direct control.

In accordance with a preferred embodiment, the temperature in the exhaust system of the internal combustion engine, and most desirably in a catalytic reactor included in the exhaust system of the internal combustion engine is used as the actual control value in the closed loop. The system of the present invention may be used, for example, to rapidly bring the catalytic reactor to its operating temperature during the warm-up time of the engine. This can easily be obtained by delaying the spark.

In accordance with another feature of the invention, and in accordance with a desirable operating characteristic, control of the ignition timing is further adjusted in dependence on a lower limiting value of uniformity or smoothness of rotation of the internal combustion engine.

The invention will be described by way of example with reference to the accompanying drawings, wherein.

Figure 1:
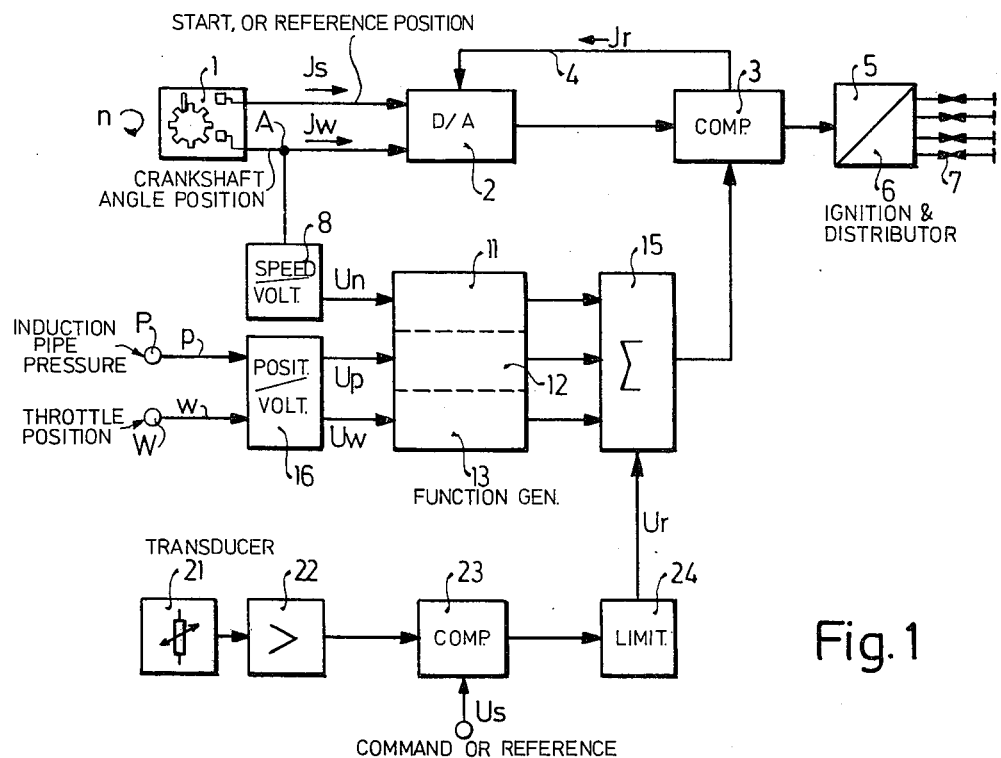
FIG. 1 is a highly schematic block diagram illustrating the system in accordance with the present invention.
Figure 2:
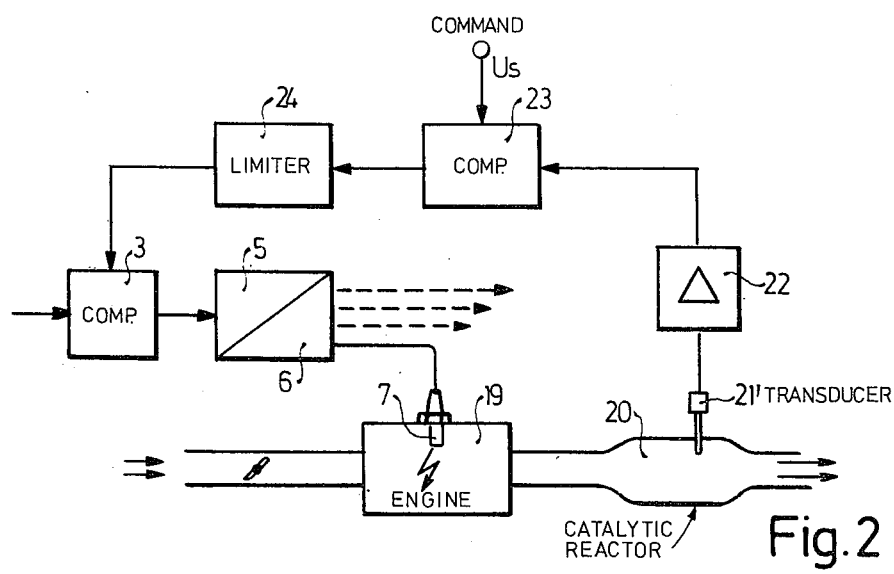
FIG. 2 is a detailed block diagram illustrating the closed loop system.

Referring first to FIG. 1: A crankshaft angle position transducer 1, and coupled to engine 19 (FIG. 2), provides, at each rotation of the crankshaft, at least two starting pulses $J_s$ and at least one, and preferably a plurality of repetitively occurring angle pulse $J_w$. The starting pulses $J_s$, as well as the angle pulses $J_w$ are applied to a digital/analog converter 2 which includes an electronic counter (not separately shown). D/A converter 2 is connected to a comparator 3. The comparator 3 provides reset pulses $J_r$ over reset line 4 to the D/A converter, in order to return the counter of the D/A converter 2 to its reset or zero position. Comparator 3 also provides a trigger pulse to an ignition and distributor circuit 5, 6; circuit 5 is, for example, a well-known standardized transistorized ignition coil combination of an ignition circuit connected to a distributor 6. Distributor 6 provides ignition pulses in a sequence determined by the construction of the internal combustion engine to spark plugs 7, each one of which is associated with one of the cylinders. Comparator 3 and the ignition system 5 provide an electronic ignition control system which, as such, is known — see, for example the cross-referenced U.S. Pat. Nos. 3,875,560 and 3,853,703, respectively.

The speed pulses $J_w$ derived, for example, from a starwheel associated with a pulse transducer having a plurality of star positions, are additionally connected to a speed-voltage converter 8, the output of which is a control voltage representative of the speed of the internal combustion engine. This voltage $U_n$ is connected to a function generator 11. Function generator 11 is associated with further function generators 12 and 13; the outputs of the function generators 12 and 13 are all connected to a summing amplifier, or combining circuit 15. The output of the combining circuit 15 is connected to the input of comparator 3 for comparison therein. Function generators 12 and 13 are, each, connected to a position/voltage converter 16 having two inputs, one of which is a signal derived from the pressure (or, rather, vacuum) $p$ in the induction pipe of engine 19, obtained, for example, from a pressure transducer P; the other input to the position/voltage converter 16 is derived from a throttle position transducer W, providing a signal $w$. Throttle position transducer W may be no more but a potentiometer, the slider of which is connected to an accelerator command pedal, or to the throttle, respectively. The position/voltage transducer provides two ouptut signals, representative of the respective position of the respective input $p$, or $w$, and applies the outputs to the respective function generator 12, 13. The respective function generator provides output voltages which correlate the respective input signal with the transfer function, depending on engine characteristic, of change in input signal, with respect to ignition timing. The output voltages from position/voltage transducer 16 are, respectively, $U_p$ and $U_w$, for the pressure, and throttle position signals, respectively. Elements 1 to 16 provide control of the ignition instant in dependence on speed $n$, induction pipe pressure $p$, and throttle position, or throttle opening angle $w$. The combination of induction pipe pressure and throttle position forms a measure of loading on the engine.

Figure 3:
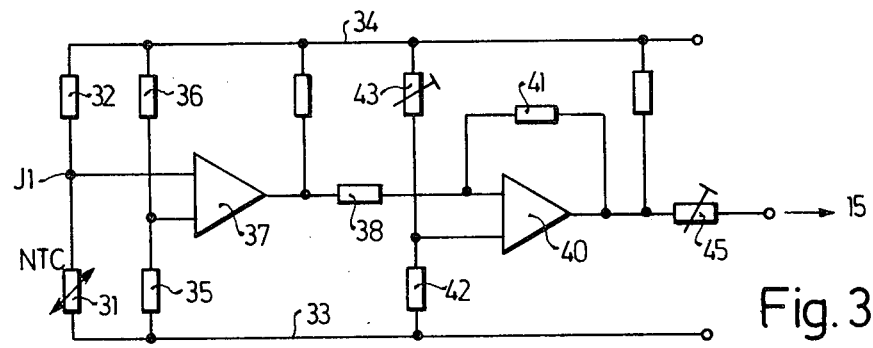
FIG. 3 is a schematic diagram to control temperature of a catalytic reactor, by means of a high-temperature, negative temperature coefficient (NTC) resistor.
Figure 4:
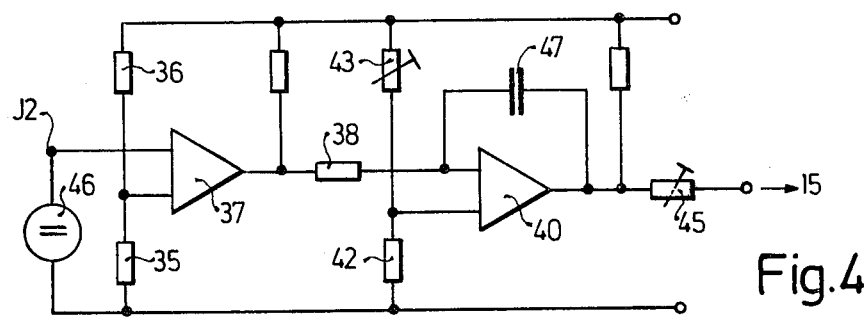
FIG. 4 is another embodiment of a circuit diagram to measure temperature of a catalytic reactor, and using a thermocouple.

In accordance with the present invention, a closed control loop is superimposed on the system so far described. The control loop, itself, is illustrated in detail in FIG. 2. A transducer generally shown at 21 (FIG. 1) and specifically 21' (FIG. 2) senses a characteristic of the exhaust gases from engine 19. One of the characteristics of the exhaust gases in the catalytic reactor 20 is temperature, and transducer 21' may, then, be a negative temperature coefficient (NTC) resistor 31 (FIG. 3) or a thermocouple 46 (FIG. 4). Another characteristic of the exhaust gases is their composition, especially NO compounds. Another value which may be used as a control loop signal is a predetermined minimum engine speed, below which the engine operates roughly, or with intermittent ignition, or "bucks." FIG. 1, therefore, illustrates the transducer 21 generally. A suitable transducer to provide a signal indicative of smooth-running engine speed may, for example, be a signal derived from terminal A, forming the output of the crankshaft angle position signal Jw, and compared with a reference signal which represents a certain minimum speed; or transducer 21 may be a vibration sensor having a certain threshold value of amplitude, or frequency, and providing an output signal indicative of rough engine operation.

Referring again to FIG. 2, in which one form of the control loop is illustrated: Transducer 21' provides an output signal to an amplifier 22, the output of which is connected at terminal B to an input to a comparator, or control amplifier 23. The other input to control amplifier 23 is a command value $U_s$. The comparator or control amplifier 23 may be an ON-OFF controller, a proportional controller, or an integral controller; the command or reference value or voltage $U_s$ is set to represent a desired condition of operation of the engine, for example a desired operating temperature of the catalytic reactor 20; or a desired composition of exhaust gases from engine 19, as sensed, for example, by a transducer 21 forming an oxygen sensing element or, if used to sense smooth running of the engine, a reference value representative of certain vibration conditions, or certain speeds of the engine can be applied. The output of controller 23 is connected to a limiter 24 which limits the control range, or control swing supplied by the system forming the loop of FIG. 2. The output of limiter 24 (see FIG. 1) is a modifying or control voltage $U_r$ which is applied to the combining circuit 15, as also schematically illustrated in FIG. 1.

As can be seen, the loop is closed through the engine itself; thus, the entire control loop includes the sensing element, the comparator 23 and the reference and command input, as well as the ignition timing comparator 3, the ignition circuit and distributor and the engine, to which the combustible mixture is applied, which will then operate in accordance with predetermined operating parameters, and have a certain exhaust or resulting consequential characteristics.

Amplifier 22 and the controller 23 may be constructed in various ways. FIG. 3 illustrates a circuit in which a temperature sensor using an NTC resistor 31 is used to sense the temperature of a catalytic reactor, for example the reactor 20 of FIG. 2. NTC resistor 31 is connected in series with a resistor 32 and across a positive and negative source of supply, formed by buses 34, 33, respectively. The junction J1 between NTC resistor 31 and resistor 32 is connected to the inverting input of an operational amplifier 37, the direct input of which is held at a predetermined voltage by being connected to the tap point of the voltage divider formed by resistors 35, 36 and connected across the supply lines. The two resistors 35, 36, as well as NTC resistor 31 and the series resistor 32, together, form a resistance bridge, the diagonal terminals of which are connected to the two respective inputs of the operational amplifier 37. Operational amplifier 37 is connected by resistor 38 to the inverting input of a second operational amplifier 40, the direct input of which is clamped to a certain potential by means of voltage divider formed of resistors 42, 43, and in which one of the resistors, as shown resistor 43, is adjustable. Operational amplifier 40 has its output coupled over a resistor 45 to combining circuit 15, and fed back through a resistor 41 to the inverting input. Resistor 43 is set to determine the command value of the temperature of the catalytic reactor 20, and the setting of resistor 43, therefore, comprises the command, or reference signal $U_s$. Operational amplifier 40 will operate as a proportional controller due to the resistive feedback path formed by resistor 41.

The circuit of FIG. 4 is basically similar to that of FIG. 3; the essential difference is, however, that the sensing element is a thermocouple 46 which is directly connected over junction J2 to the inverting input of the first operational amplifier 37. In contrast to FIG. 1, however, the second operational amplifier 40 operates as an integral controller since a capacitor 47 is provided in the feedback path between the output and the inverting input thereof. In all other respects, the circuit is similar.

Figure 5:
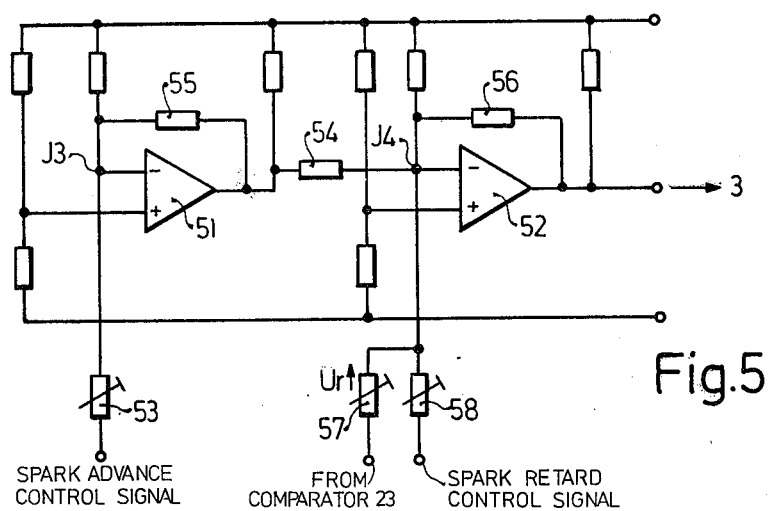
FIG. 5 is a circuit diagram of a summing, or combining circuit with additional signal inputs representative of various operating parameters.

FIG. 5 illustrates a simple circuit which can be used for the combining, or summing circuit 15. It includes first and second operational amplifiers 51, 52. The inverting input of the first operational amplifier 51 has an adjustable resistor 53 connected thereto, to which a spark advance control signal is applied. This spark advance control signal is supplied by a function generator, not shown in FIG. 5, and providing output functions which, generally, are directed to advance the spark with respect to a set datum position, as determined by elapsed angular change from a predetermined angular position with respect to dead-center of the piston. The output of first operational amplifier 51 is fed back to the inverting input connection J3 over a resistor 55, in order to ensure essentially linear amplification of input signals applied to junction J3. Similarly, the second operational amplifier 52 has a feedback resistor 56 coupling its output to the inverting input junction J4. The output of first operational amplifier 51 and junction J4 are coupled by resistor 54. The inverting input J4 of second operational amplifier 52 is connected over a controllable resistor 57 to an output voltage $U_r$ derived from controller 23 (FIGS. 2, 3 or 4), and forming the control value $U_r$. An additional resistor 58 can likewise be connected to junction J4, in order to apply other control voltages thereto which are provided by function generators (not shown in FIG. 5) causing spark delay. The control voltage applied, for example, through resistor 58 is superimposed on that of the voltage derived from comparator 23, that is, voltage Ur applied through resistor 57. The overall control range is limited by the operating range of operational amplifier 52 or can be limited before being applied to junction J4, for example by a biassed diode network.

Other control parameters may be applied to junction J3, J4, as desired; for example the output from the function generators 11, 12, 13 can be applied to the junctions J3, J4; these outputs, if of dual polarity — for example positive to cause spark advance and negative to cause spark retard — can be applied with the respective polarity to terminal J3, J4, depending upon whether the spark is to be advanced or retarded, in parallel to the resistors 53 and 57, 58, respectively, as shown. Suitable de-coupling diodes may be inserted between the junction J4 and the respective coupling resistor, if the circuit configurations make additional de-coupling desirable.

Various changes and modifications may be made, and features described in connection with any one embodiment may be used with any one of the others, within the scope of the inventive concept.

I claim:

1. Electronic ignition system for internal combustion engines to control the timing of ignition instant with respect to engine crankshaft position having sensing means (1, 8; 16) generating at least one sensing signal representative of an engine operation parameter;

at least one function generator (11, 12, 13) connected to and controlled by the respective signal generating means and generating a signal representative of ignition timing in dependence on the respective parameter being sensed;

means (3, 5, 6, 15) connected to and controlled by said function generator and providing an ignition trigger signal at a predetermined instant of time with respect to engine crankshaft position; and a closed control loop (3, 5, 6, 7, 19, 20, 21, 21', 23, 24) including
 a. the engine (19) itself,
 b. a transducer (21, 21') responsive to an actual engine operating condition varying with variation in ignition timing and providing an operating signal,
 c. means (Us, 35, 36) providing a command reference signal representative of a commanded engine operating condition,
 d. a comparator (23) having the operating signal applied thereto and comparing said operating signal with the predetermined command reference signal (Us) and providing an error output signal (Ur), the error output signal being applied as a superimposed additional control signal to said ignition trigger signal providing means (3, 5, 6, 15) to additionally affect ignition timing in accordance with the error signal in said loop.

2. System according to claim 1, wherein said sensing signal is derived from a signal generating means (1, 8, 16) and connected to a respective function generator (11, 12, 13);

and the ignition trigger signal providing means includes signal combining means (15) combining the output of the respective function generator and the error output signal (Ur) of said closed control loop to superimpose the error output signal (Ur) of said closed control loop on the control effect by said parameter, as modified by the respective function generator.

3. System according to claim 2, wherein the parameter is engine speed and the signal generating means comprises means (1, 8) generating a signal representative of engine speed.

4. System according to claim 1, wherein the engine has a catalytic exhaust reactor, the transducer (21, 21') is a temperature sensor, and the actual engine operating condition signal is a signal representative of temperature of the reactor.

5. System according to claim 1, wherein the engine has a catalytic exhaust reactor, the transducer (21, 21') is an oxygen sensor, and the actual engine operating condition signal is a signal representative of NO compounds passing through the reactor.

6. System according to claim 1, wherein the actual engine operating condition signal is a signal representative of the concentration of predetermined amounts of exhaust gas emitted from the engine.

7. System according to claim 1, wherein the actual engine operating condition signal is a signal representative of engine speed with respect to a predetermined minimum speed.

8. System according to claim 1, wherein the transducer (21) is a vibration sensor and the actual engine operating condition signal is a characteristic of the smoothness or uniformity of rotation of the engine.

9. System according to claim 1, wherein the command reference signal (Us) has a value representative of desired operating condition of the engine.

10. System according to claim 1, wherein the ignition trigger signal providing means includes a signal combining means (15);

the signal sensing means (1, 8, 16) and the function generator means (11, 12, 13) comprise an engine speed transducer (1, 8) providing an engine speed signal (Un, Js, Jw) and controlling generation of an ignition trigger signal depending on engine speed, and at least one of: an induction pipe pressure signal generating means (P) and a throttle position generating means (W) providing a loading signal (Up, Un) depending on engine loading;

said engine speed signal (Un) and said engine loading signal (Up, Uw) being applied to said combining means (15) and directly effective to control ignition timing;

the error output signal (Ur) derived from the closed control loop being connected to said combining means (15) so that the error output signal (Ur) from said closed control loop will be combined with said speed signal (Un) and said loading signal (Up, Uw) to jointly control ignition timing.

11. System according to claim 10, wherein the actual engine operating condition signal is a characteristic of the exhaust gases of the engine.

12. System according to claim 10, wherein the actual engine operating condition signal is a characteristic of engine speed below a predetermined threshold value.

13. System according to claim 10, wherein the actual engine operating condition is a characteristic of smoothness, or uniformity of rotation of the engine.

14. System according to claim 1, wherein the engine operating parameter signal sensing and generating means sense operating parameters arising upon engine operation under given loading, and the transducer is additional to said sensing means and connected to the engine to sense actual engine operating condition.

* * * * *